No. 648,169. Patented Apr. 24, 1900.
J. I. DE JONGH.
CANE STRIPPING AND CUTTING MACHINE.
(Application filed July 6, 1899.)

(No Model.)

Witnesses:
Inventor:

UNITED STATES PATENT OFFICE.

JUAN I. DE JONGH, OF SAN JOSÉ, COSTA RICA.

CANE STRIPPING AND CUTTING MACHINE.

SPECIFICATION forming part of Letters Patent No. 648,169, dated April 24, 1900.

Application filed July 6, 1899. Serial No. 722,912. (No model.)

*To all whom it may concern:*

Be it known that I, JUAN I. DE JONGH, a subject of the Queen of the Netherlands, and a resident of San José, in the Republic of Costa Rica, have invented certain new and useful Improvements in Cane Stripping and Cutting Machines, of which the following is a specification.

This invention relates to certain new and useful improvements in cane stripping and cutting machines, and has for its object the production of a simple and efficient apparatus by the use of which standing sugar-cane may be stripped and cut much more rapidly and with less labor and fewer hands than now commonly necessary.

To these ends, therefore, my invention consists in a dray or movable platform carrying power generating and transmitting devices and a suitable number of rotatory saws mounted upon flexible shafts and operated by said power devices, and also in the details of construction and the arrangement and combination of parts, all as hereinafter more fully described, and pointed out in the claims.

Figure 1:
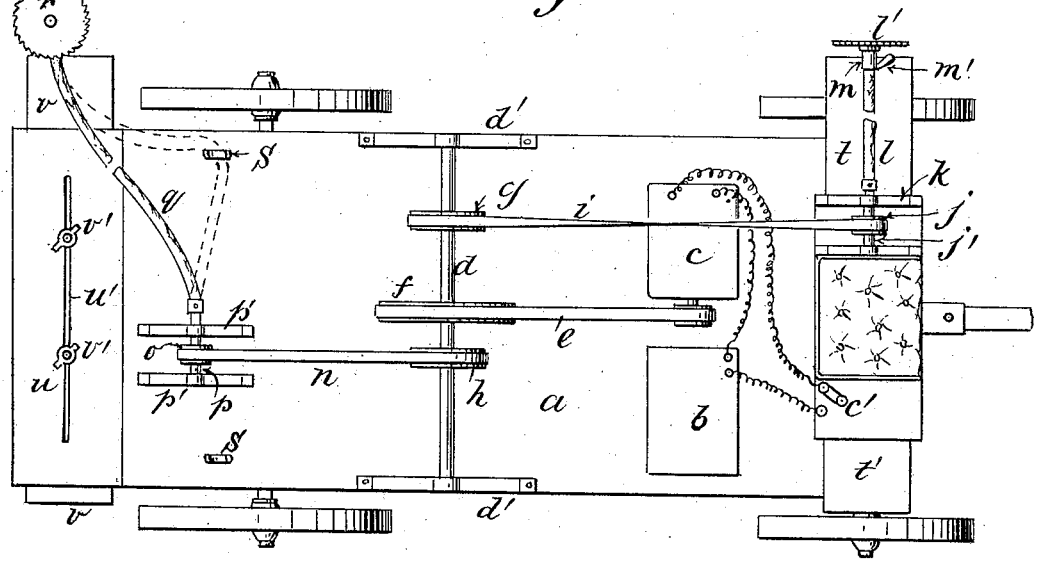
Figure 2:
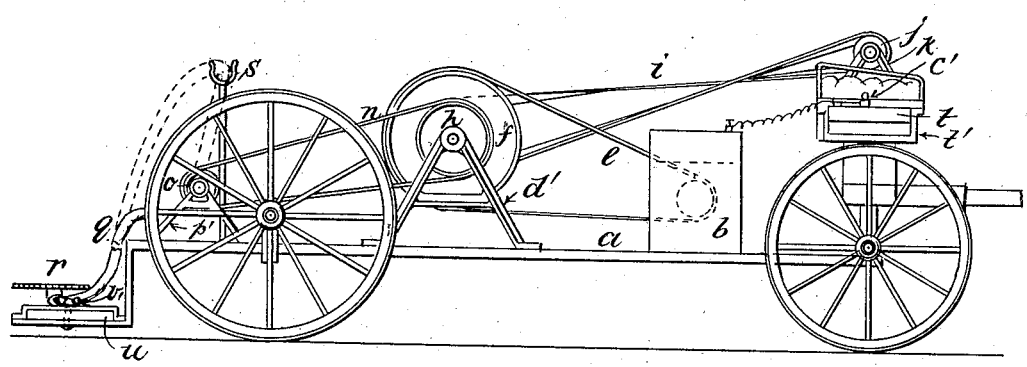

Referring to the accompanying drawings, illustrating my invention, and in the figures of which like parts are similarly designated, Figure 1 is a top plan view showing one form of my invention, and Fig. 2 is a side elevation thereof.

$a$ is preferably a low platform mounted upon wheels and adapted to be propelled by any suitable means, as by a traction-engine, although I prefer to draw the same by horses or mules.

Mounted upon the platform $a$ is any suitable source of power, here shown as an electric storage battery $b$ and an electric motor $c$, which is under the control of the driver through switch $c'$. Other types of motor—such as steam, compressed air, gasolene or naphtha engines, &c.—may be used, if desired; but I prefer to employ electricity on account of ease of recharging the batteries as well as freedom from danger of sparks firing the standing cane.

$d$ is a transverse shaft journaled in bearings in the brackets or standards $d'$ and rotated by the belt $e$, extending around the belt-wheel of the motor $c$ and around the large pulley $f$ on said shaft $d$. Also keyed to said shaft $d$ are the two small pulleys $g$ and $h$, from the former of which extends the crossed belt $i$, passing around the still smaller pulley $j$ on the short shaft $j'$, which is journaled in suitable brackets $k$, elevated above the platform $a$, and coupled to said shaft $j'$ is the flexible shaft $l$, of well-known construction, capable of motion in any direction and carrying at its free end a stationary collar $m$, provided with a handle $m'$ and the stripping-saw $l'$.

From the pulley $h$ on shaft $d$ extends the belt $n$ about the small pulley $o$ on the short shaft $p$, journaled in the brackets or standards $p'$ and having coupled to its end the flexible shaft $q$, carrying the circular cutting-saw $r$ and having a collar and handle (not shown) similar to those on the stripping-saw.

Near the rear end and at either side of the platform $a$ are the forked standards $s$ in which the flexible shaft $q$ may rest, as shown in dotted lines, and be kept from contact with the rear wheels when the cutter operates forwardly.

By the described arrangement of pulleys and belting the speed of the motor is obviously multiplied at the saws, and this speed may be varied and altered at pleasure by increasing or diminishing the diameter of the pulleys.

Near the front of the machine is the elevated stripper's stand or platform, which may consist of a board or plank $t$, sliding in stirrups $t'$ beneath the driver's seat and capable of extension on either side of the apparatus beyond the front wheels. Standing on this platform the stripper by means of the saw $l'$ rapidly strips the leaves from the standing cane, leaving the same bare and ready for cutting. If desired, a light guard-rail may be placed at the ends of platform $t$ as a protection to the stripper when reaching over beyond the apparatus. It is desirable that the cane should be cut as close to the ground as possible. Hence at the rear of platform $a$ is arranged the step or lower platform $u$, which also carries a laterally-extensible platform $v$, upon which the cutter stands, and by means of the saw $r$ cuts the stripped cane and throws it to one side.

If desired, the platform $v$ may be fastened in more or less extended position, as by providing the lower step $u$ with the longitudinal slot $u'$, through which project bolts passing through the platform $v$ and having the wing-nuts $v'$. Other means of securing said platform against lateral displacement may be employed, if preferred, and will readily suggest themselves.

By means of the high speed of the saws bare contact with the leaves or the cane is sufficient to strip and to cut it, and by the use of flexible shafts great latitude of movement is obtained, enabling the operators to reach in any direction and strip and cut the irregularly-growing cane.

Obviously the stripping apparatus may be dispensed with, if desired. The stripper's platform may be depressed and the saw $l'$ used as a cutting-saw. Beveled gears may be substituted for the belting and pulleys shown and described. More saws may be added to and run by the machine. Other forms of motive power may be used, and by a simple arrangement standards carrying electric lights run by the batteries $b$ may be placed on the platform $a$, enabling the apparatus to be used at night; but these and many other changes and alterations may be made by a mechanic skilled in the art without departing from the principle and scope of my invention and involving merely a mechanic's skill.

What I claim as new, and desire to secure by Letters Patent, is—

1. In a cane stripping and cutting machine, a movable platform, elongated flexible shafts supported at one end upon said platform and having their opposite ends free to move in any direction, stripping and cutting devices mounted on the free ends of the flexible shafts, and means for rotating the same substantially as set forth.

2. A movable platform, provided with laterally-extensible stands or platforms, and carrying a motor, power-transmitting devices and one or more rotatory saws each mounted at the free end of a flexible shaft and adapted to be rotated by said power devices, substantially as described.

3. A platform mounted on wheels and having laterally-sliding stands or auxiliary platforms, one at each end; the front one of which is elevated above, and the rear one of which is depressed below, the plane of the main platform; in combination with a motor or source of power, power-transmitting devices and flexible shafts near opposite ends of said platform and each carrying a rotatory saw; and means, such as forked standards, for keeping the rear flexible shaft out of contact with the platform-wheels, substantially as described.

Signed at New York, in the county of New York and State of New York, this 5th day of July, A. D. 1899.

JUAN I. DE JONGH.

Witnesses:
FREDERIC CARRAGAN,
J. B. TANNER.